United States Patent
Canova et al.

(10) Patent No.: US 11,076,692 B2
(45) Date of Patent: Aug. 3, 2021

(54) STORAGE CLASP AND MODULAR TRACK ASSEMBLY AND METHOD OF USING SAME

(71) Applicant: Coastal Innovative, LLC, Baton Rouge, LA (US)

(72) Inventors: Brian Canova, Lafayette, LA (US); Gaines Garrett, Baton Rouge, LA (US); Marc Couvillion, Baton Rouge, LA (US)

( * ) Notice: Subject to any disclaimer, the term of this patent is extended or adjusted under 35 U.S.C. 154(b) by 0 days.

(21) Appl. No.: 16/676,864

(22) Filed: Nov. 7, 2019

(65) Prior Publication Data

US 2020/0138189 A1    May 7, 2020

Related U.S. Application Data

(60) Provisional application No. 62/756,796, filed on Nov. 7, 2018.

(51) Int. Cl.
| | |
|---|---|
| *A47B 81/00* | (2006.01) |
| *A01K 97/10* | (2006.01) |
| *F16L 3/22* | (2006.01) |
| *F16L 3/10* | (2006.01) |
| *A47B 47/00* | (2006.01) |
| *F16B 2/10* | (2006.01) |
| *B25H 3/04* | (2006.01) |
| *F16L 3/227* | (2006.01) |

(52) U.S. Cl.
CPC ............ *A47B 81/005* (2013.01); *A01K 97/10* (2013.01); *A47B 47/0091* (2013.01); *B25H 3/04* (2013.01); *F16B 2/10* (2013.01); *F16L 3/1075* (2013.01); *F16L 3/227* (2013.01)

(58) Field of Classification Search
CPC .. A47B 81/005; A47B 47/0091; A01K 97/10; A01K 97/08; F16L 3/227; F16L 3/1075; F16B 2/10; F16B 5/0052; F16B 45/02; F16B 7/0433; B25H 3/04
See application file for complete search history.

(56) References Cited

U.S. PATENT DOCUMENTS

| | | | | |
|---|---|---|---|---|
| 2,248,170 A | * | 7/1941 | Hansen | B60R 9/02 |
| | | | | 224/570 |
| 3,167,182 A | * | 1/1965 | Calvin | B60R 7/14 |
| | | | | 211/64 |
| 4,170,801 A | * | 10/1979 | Ward | A01K 97/08 |
| | | | | 114/343 |
| 4,450,989 A | * | 5/1984 | Bogar, Jr. | A47B 81/005 |
| | | | | 211/64 |

(Continued)

*Primary Examiner* — Stanton L Krycinski
(74) *Attorney, Agent, or Firm* — Ted M. Anthony; Sarah B. Dupont

(57) ABSTRACT

The present invention pertains to a hinged device for use in securely storing or organizing a variety of different devices in a variety of different locations, such as, for example, a plurality of fishing rods. The present invention pertains to a storage clasp apparatus and modular track assembly, having a plurality of storage clasps comprising a hinged member and an internal bore for easily receiving and removing said fishing rods. More particularly, the present invention pertains to a storage clasp apparatus and modular track assembly, having at least one slide track member for use in easily and efficiently mounting a plurality of said storage clasps, and thus, maintaining and storing said fishing rods in an organized manner.

8 Claims, 23 Drawing Sheets

(56) References Cited

U.S. PATENT DOCUMENTS

| | | | | |
|---|---|---|---|---|
| 4,776,471 A * | 10/1988 | Elkins | ............... | A47B 57/52 |
| | | | | 211/64 |
| D310,446 S * | 9/1990 | Elkins | ............... | 211/64 |
| 5,078,279 A * | 1/1992 | Hancock | ............... | A47B 81/005 |
| | | | | 211/64 |
| 5,344,032 A * | 9/1994 | Ramsdell | ............... | A47B 81/005 |
| | | | | 211/64 |
| 5,524,772 A * | 6/1996 | Simmons | ............... | A47B 81/005 |
| | | | | 211/4 |
| 5,915,572 A * | 6/1999 | Hancock | ............... | A47B 81/005 |
| | | | | 211/64 |
| 5,979,846 A * | 11/1999 | Fluhr | ............... | B60R 7/14 |
| | | | | 211/64 |
| 6,637,707 B1 * | 10/2003 | Gates | ............... | A47B 81/005 |
| | | | | 211/64 |
| 6,789,712 B2 * | 9/2004 | Gates | ............... | B60R 9/048 |
| | | | | 211/64 |
| 6,793,109 B2 * | 9/2004 | Gates | ............... | A47B 81/005 |
| | | | | 211/64 |
| 7,762,408 B2 * | 7/2010 | Sargent | ............... | B60P 3/14 |
| | | | | 211/85.7 |
| 7,770,740 B2 * | 8/2010 | Punzel | ............... | A47B 81/005 |
| | | | | 211/64 |
| 7,938,278 B2 * | 5/2011 | Dientsmann | ............... | A63B 55/10 |
| | | | | 211/70.2 |
| D643,500 S * | 8/2011 | Sanders | ............... | D22/199 |
| 8,651,289 B2 * | 2/2014 | Diaz, Jr. | ............... | B60R 7/14 |
| | | | | 211/64 |
| 9,604,703 B2 * | 3/2017 | Kardas | ............... | A01K 97/10 |
| 2007/0170128 A1 * | 7/2007 | Punzel | ............... | F41A 23/18 |
| | | | | 211/64 |
| 2015/0060378 A1 * | 3/2015 | Bestor | ............... | A47B 81/005 |
| | | | | 211/70.8 |

* cited by examiner

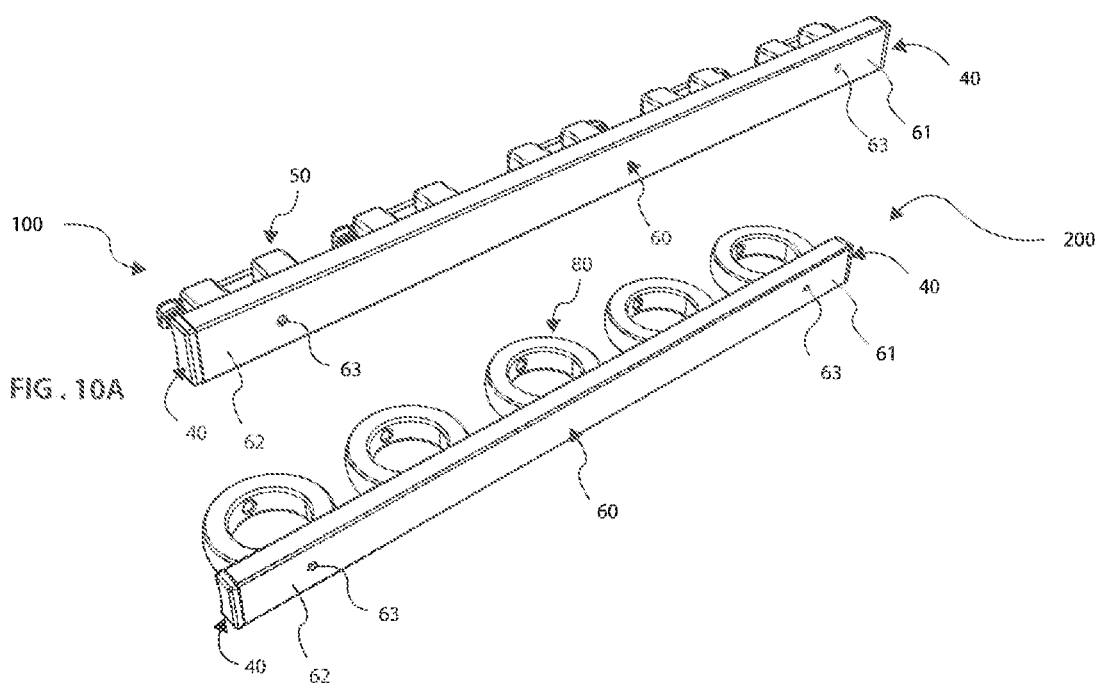

STORAGE CLASP AND MODULAR TRACK ASSEMBLY AND METHOD OF USING SAME

CROSS REFERENCES TO RELATED APPLICATION

PRIORITY OF U.S. PROVISIONAL PATENT APPLICATION Ser. No. 62/756,796, FILED Nov. 7, 2018, INCORPORATED HEREIN BY REFERENCE, IS HEREBY CLAIMED.

STATEMENTS AS TO THE RIGHTS TO THE INVENTION MADE UNDER FEDERALLY SPONSORED RESEARCH AND DEVELOPMENT

NONE

BACKGROUND OF THE INVENTION

Field of the Invention

The present invention pertains to a device for use in securely storing or organizing a variety of different devices in a variety of different locations, such as, for example, storing a plurality of fishing rods, organizing a plurality of electrical wires, storing a variety of different tools, or any other similar means. More particularly, the present invention pertains to a hinged apparatus for use in quickly securing and releasing a variety of different items (such as, for example, fishing rods, ropes, wires, tools, or any other similar device) that can be track mounted, or secured by alternate means.

Brief Description of the Prior Art

Conventional fishing rod storage systems are typically large, bulky, outdated, and unable to withstand a variety of different environmental elements, and do not fully secure a rod tip or allow for easy insertion and removal of the device. As a result, these conventional fishing rod storage systems limit a user's storage options and generally increase the risk of breaking the fishing rods. Other conventional devices can be bulky, expensive, and require substantially more room for installation. Additionally, these other devices do not completely enclose the fishing rods, and thus do not fully secure said fishing rods, which can result in entanglement, thereby releasing the rod from its attachment point. This can also result in the fishing rods becoming disconnected from said conventional devices, thus causing said fishing rods to fall and potentially break.

As such, there is a need for a device that can completely close around a fishing rod in order to securely mount said rod to a variety of different surfaces. There is also a need for a device that can securely store and organize said fishing rods. There is also a need for a device that can securely mount said fishing rods, while simultaneously allowing said mount to be a part of a modular system that can grow and expand, as desired and needed by a particular user.

SUMMARY OF THE INVENTION

The present invention pertains to a storage clasp apparatus and modular track assembly for use in securely storing a variety of different devices, including, but not limited to a plurality of fishing rods, or any other similar devices exhibiting like characteristics. Moreover, the present invention pertains to a device for use in securely storing said devices in a variety of different locations, such as, for example, a variety of different wires within an electrical industry, a variety of tools, or any other similar means.

Said storage clasp apparatus of the present invention generally comprises a body member having a hinged apparatus for use in quickly securing and releasing a plurality of fishing rods, ropes, wires, tools, or any other similar devices, that can be track mounted, or secured by alternate means. The present invention further comprises a modular track assembly having at least one slide track member that allows a plurality of said storage clasps to be aligned and secured, thereby allowing a plurality of said storage claps to be mounted at a single time. As such, the present invention comprises a storage clasp and modular track assembly that is substantially lightweight, compact, and more secure than conventional devices, while simultaneously allowing said present invention to grow with a particular user by way of adding additional storage clasps and mounting tracks, as desired.

By way of illustration, but not limitation, said storage clasp and modular track assembly of the present invention comprises a number of advantages, including, but not limited to, being relatively easy to install, having adjustable rod spacing, fitting rods (or tools) of different sizes, having a clean and modern design, being corrosion resistant, comprising a plurality of "snap locking" clips to securely hold said rods in place, comprising set screws to allow for custom adjustments, and being modular in nature, thus allowing for a plurality of sections to be added together.

Additionally, said storage clasp and modular track assembly can comprise a variety of different configurations and alternate embodiments. For example, in an alternate embodiment, said modular track assembly can be integrated into a variety of different organizational systems, thereby allowing a user to be able to easily and safely transport and/or store additional fishing rods, or other similar devices, while simultaneously staying organized.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

FIG. 10A depicts a perspective view of a preferred embodiment of a modular track assembly of the present invention comprising a plurality of storage clasps secured to a slide track assembly.

FIG. 10B depicts a perspective view of an alternate embodiment of a modular track assembly of the present invention comprising a plurality of storage clasps secured to a slide track assembly.

DETAILED DESCRIPTION OF A PREFERRED EMBODIMENT

Figure 1:
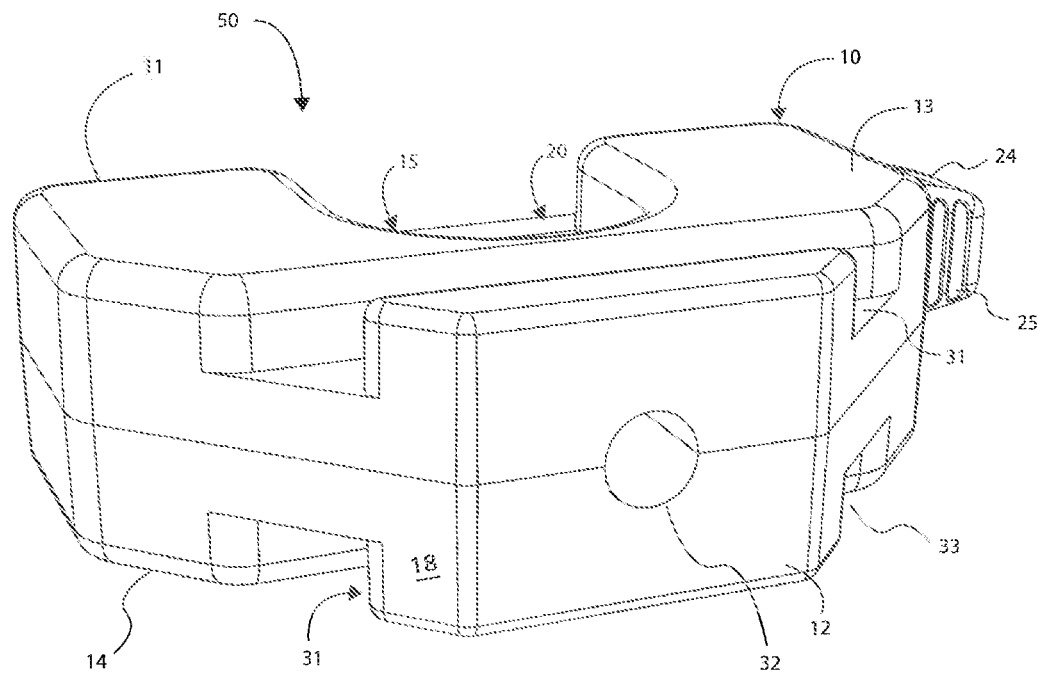
FIG. 1 depicts a perspective view of a preferred embodiment of a storage clasp apparatus of the present invention.

Referring to the drawings, the present invention comprises a storage clasp and modular track assembly 100 for use in securely storing a plurality of fishing rods in a substantially secure, quick, and convenient manner. In a preferred embodiment, said storage clasp and modular track assembly 100 of the present invention can be manufactured from a substantially rigid but versatile material, such as, for example, a plastic material, or any other similar material exhibiting like characteristics. Additionally, by way of illustration, but not limitation, said storage clasp and modular track assembly 100 can be manufactured in a variety of different sizes and shapes in order to allow said apparatus to be able to store alternate materials or devices having a variety of different shapes, dimensions, and sizes.

FIG. 1 depicts a perspective view of a preferred embodiment of a storage clasp apparatus 50 of the present invention. Storage clasp apparatus 50 of the present invention generally comprises a body member 10, or a clasp member, wherein said body member 10 further comprises a first end 11, a second end 12, a top surface 13 and a bottom surface 14. Said body member 10 further comprises a substantially "U-shaped" void 15 that is located in a substantially central location of said body member 10. Said void 15 allows for said fishing rods to be received within said body member 10 of said storage clasp apparatus 50.

In a preferred embodiment, said first end 11 of body member 10 comprises a hinge member 20, or a locking mechanism, wherein said hinge member 20 further comprises a ball hinge 22, an arm member 21, and a latch 24 (although not depicted in FIG. 1). Said second end 12 of said body member 10 comprises a mounting track 31 and a mounting hole 32 for use in allowing storage clasp assembly 50 of the present invention to be securely mounted or attached to a wall, or any other similar planar surface that can be used for storage purposes. Said mounting track 31 comprises a channel 33 having an indentation, wherein said channel 33 is located on both said top surface 13 and said bottom surface 14 of said body member 10. Said mounting hole 32 is located in a substantially central point on an outer surface 18 of said second end 12.

Figure 2:
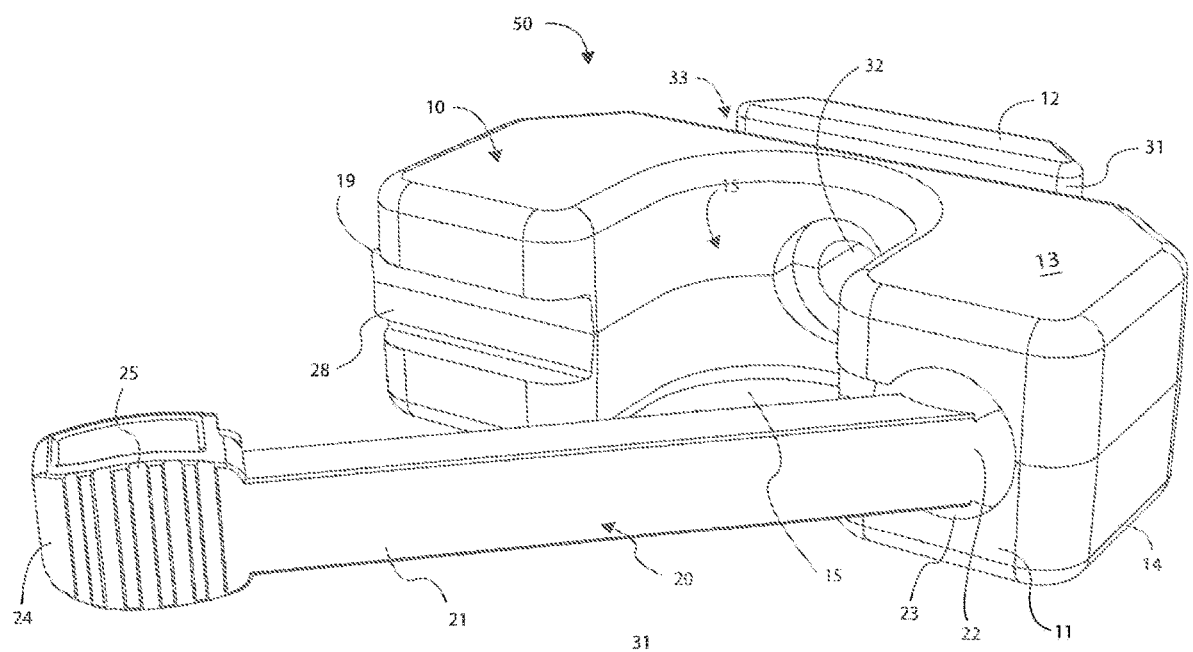
FIG. 2 depicts a perspective view of a preferred embodiment of a storage clasp apparatus of the present invention with an arm member in an open configuration.
Figure 3:
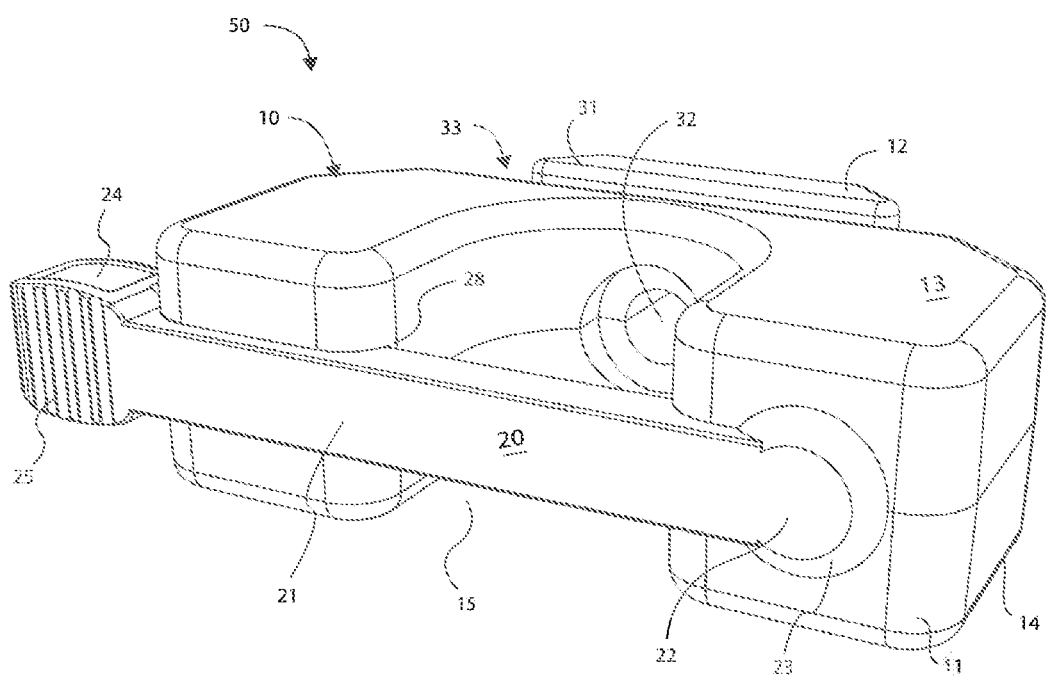
FIG. 3 depicts a perspective view of a preferred embodiment of a storage clasp apparatus of the present invention with an arm member in a closed configuration.

FIG. 2 depicts a perspective view of a preferred embodiment of a storage clasp apparatus 50 of the present invention with an arm member 21 in a substantially open configuration. Additionally, FIG. 3 depicts a perspective view of a preferred embodiment of a storage clasp apparatus 50 of the present invention with an arm member 21 in a closed configuration. Storage clasp apparatus 50 of the present invention generally comprises a body member 10, wherein said body member 10 further comprises a first end 11 and a second end 12. In a preferred embodiment, said first end 11 of body member 10 comprises a hinge member 20, wherein said hinge member 20 further comprises a ball hinge 22, an arm member 21, and a latch 24. Said ball hinge 22 is connected to first end 11 of body member 10 by way of a cavity 23 that allows ball hinge 22 to rotate within said cavity 23, thereby allowing said hinge member 20 to open and close, as desired. As a result, arm member 21 can thus open and close relative to said body member 10 of storage clasp apparatus 50. Moreover, first end 11 of body member 10 further comprises an indentation or channel 28 in which arm member 21 can be received and remain in place, while arm member 21 is in a substantially closed position, as illustrated in FIG. 3.

When said arm member 21 is in a substantially closed position, said latch 24 attachably connects to said first end 11 of body member 10 by way of securing to a notch 19 on said body member 10, thereby securely fastening said hinge member 20 to said body member 10. Said notch 19 extends in a substantially outward direction from said body member 10, thereby creating a fastener in which latch member 24 can attachably grasp and connect. Additionally, said notch 19 and said arm member 21 have a substantially easy release mechanism that allows a user to quickly retrieve a fishing rod, or any other item, that is enclosed within said storage clasp apparatus 50 at any time.

Still referring to FIGS. 2 and 3, in a preferred embodiment, when hinge member 20 is securely fastened to body member 10, a groove or void 15 within said body member 10 and an enclosure of hinge member 20 thus create a substantially "U-shaped" opening 15 within said storage clasp assembly 50. Said opening 15 allows for said fishing rods, or other similar objects or devices, to be received within said storage clasp assembly 50, and ultimately, secured in place by way of said enclosure.

Figure 4:
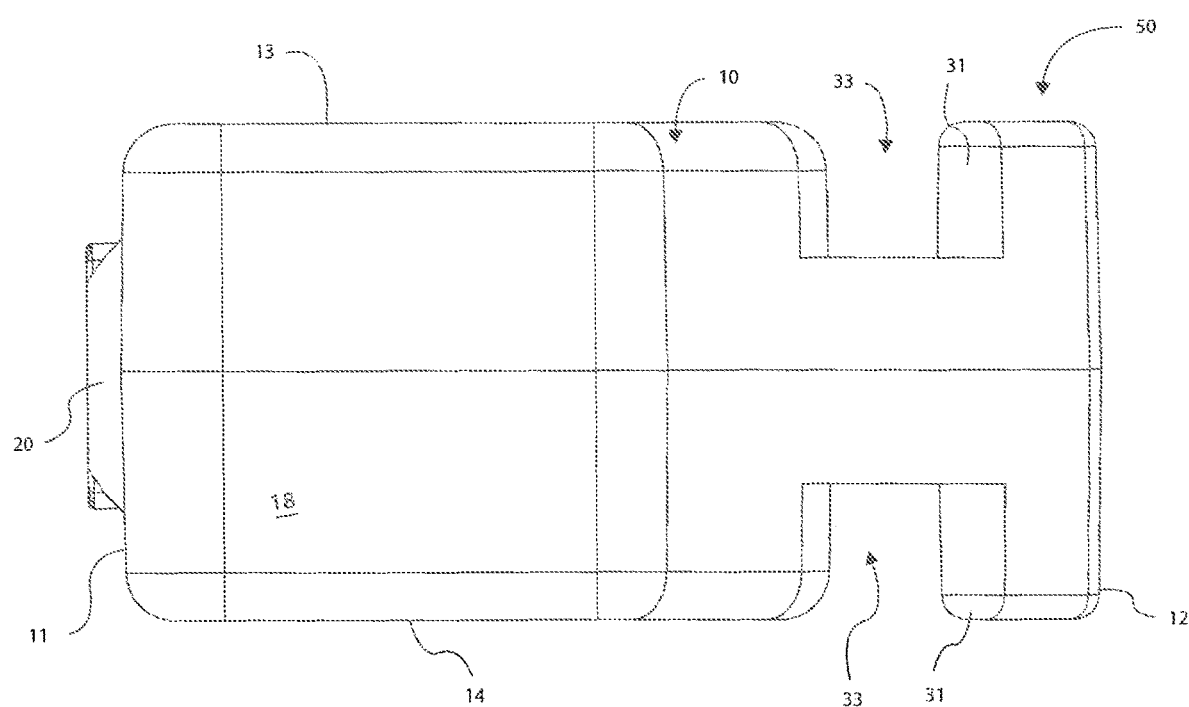
FIG. 4 depicts a side view of a preferred embodiment of a storage clasp apparatus of the present invention.

FIG. 4 depicts a side view of a preferred embodiment of a storage clasp apparatus 50 of the present invention. Storage clasp 50 comprises body member 10, wherein body member 10 has first end 11 and second end 12. First end 11 comprises hinge member 20, arm member 21, and latch member 24, wherein latch member 24 attachably fastens to notch member 19 when arm member 21 is in a substantially closed configuration. Second end 12 comprises mounting track 31 and mounting hole 32, wherein mounting track 31 comprises a substantially indented channel 33, or a track groove, in both top surface 13 and bottom surface 14 of body member 10, thereby allowing body member 10 of storage clasp apparatus 50 to be received and connected to mounting track assembly, although not illustrated in FIG. 4.

Figure 5:
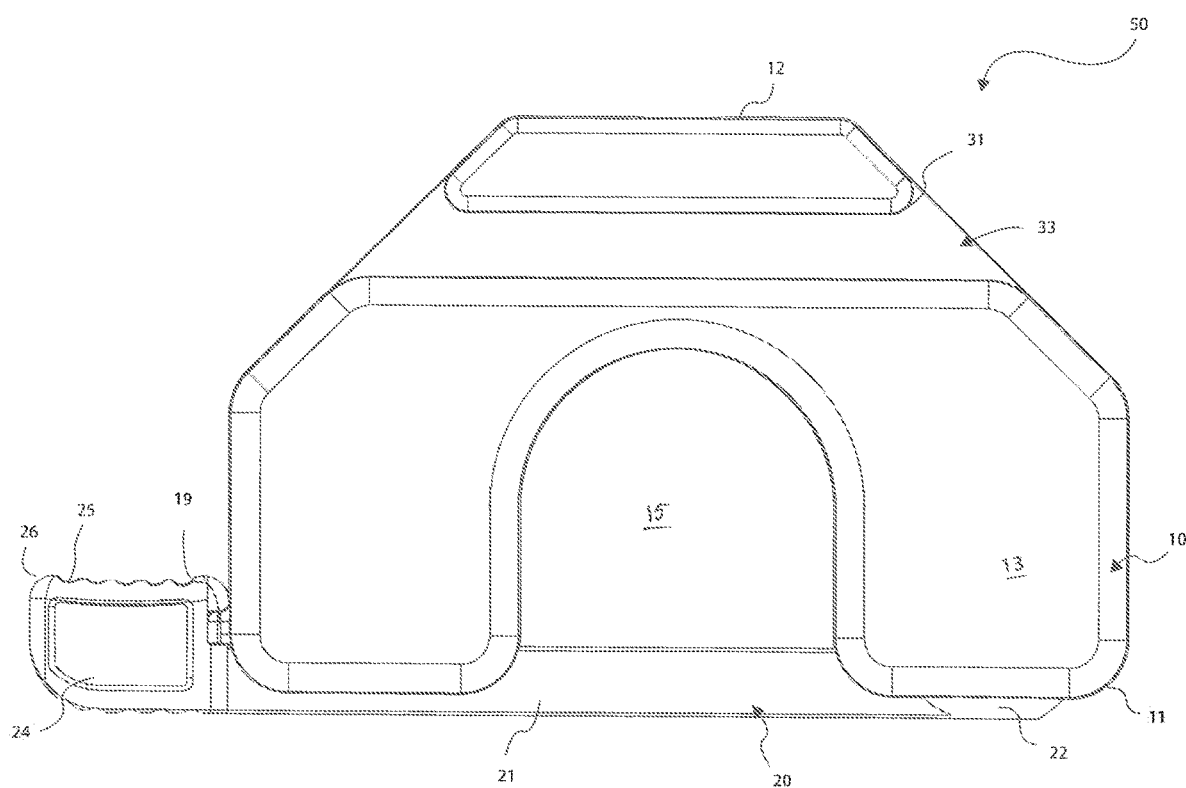
FIG. 5 depicts an aerial view of a preferred embodiment of a storage clasp apparatus of the present invention.

FIG. 5 depicts an aerial view of a preferred embodiment of a storage clasp apparatus 50 of the present invention. Storage clasp apparatus 50 comprises body member 10, having first end 11, second end 12, top surface 13, and bottom surface 14. Body member 10 comprises void member 15, wherein void member 15 allows for a space wherein said fishing rods, or other similar devices or tools, can be received within storage clasp apparatus 50, and thus secured for storage purposes or for transportation purposes.

First end 11 comprises hinge member 20, having arm member 21, ball hinge 22, and latch member 24. When hinge member 20 is in a closed position, arm member 21 attachably connects to first end 11 of body member 10 by way of being received within arm groove 28 of first end 11. Additionally, latch member 24 attachably connects and fastens to notch 19, wherein notch 19 extends in a substantially outward position from outer surface 18 of body member 10.

Latch member 24 comprises a plurality of ridges 25, or grooves, along an outer surface 26 of latch member 24, wherein grooves 25 allow for a user to easily grasp latch member 24. As a result, a user can easily push latch member 24 in a direction towards first end 11 of body member 10, thereby closing hinge member 20, or a user can easily pull on latch member 24 in a direction away from first end 11 of body member 10, thereby opening hinge member 20.

Still referring to FIG. 5, second end 12 of body member 10 comprises a mounting track 31, wherein mounting track 31 further comprises track groove 33 located within both top surface 13 and bottom surface 14 of body member 10. Mounting track 31 thereby allows a user to attachably connect and secure storage clasp apparatus 50 to mounting track assembly 60.

Figure 6:
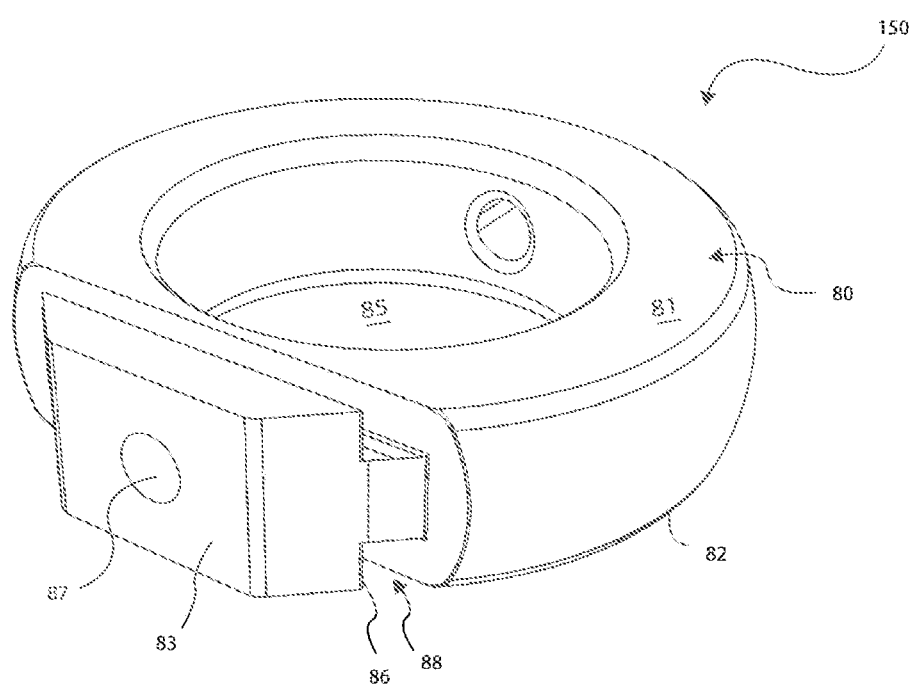
FIG. 6 depicts a perspective view of an alternate embodiment of a storage clasp apparatus of the present invention.
Figure 7:
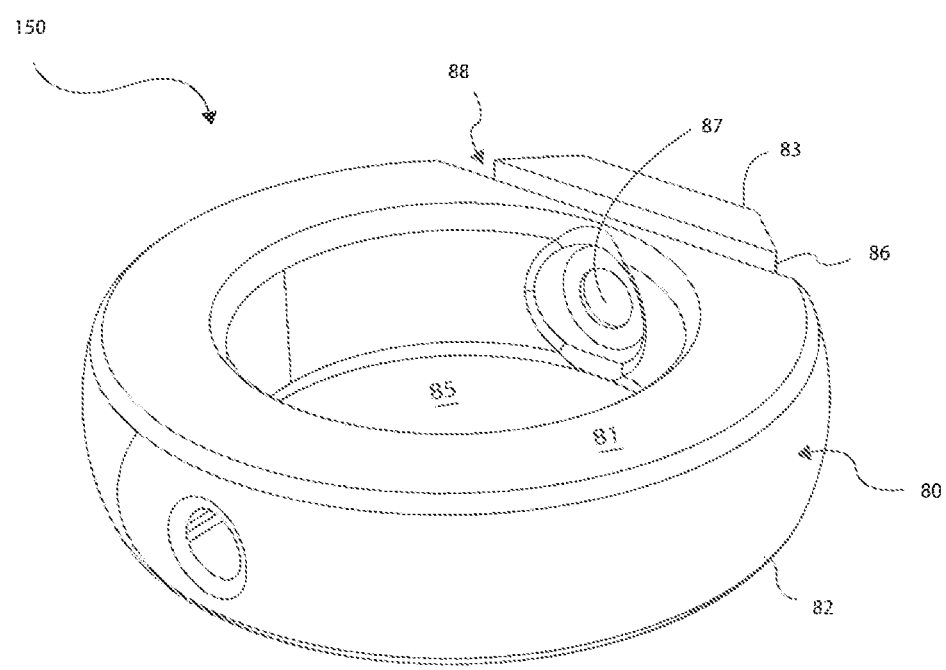
FIG. 7 depicts a perspective view of an alternate embodiment of a storage clasp apparatus of the present invention.
Figure 8:
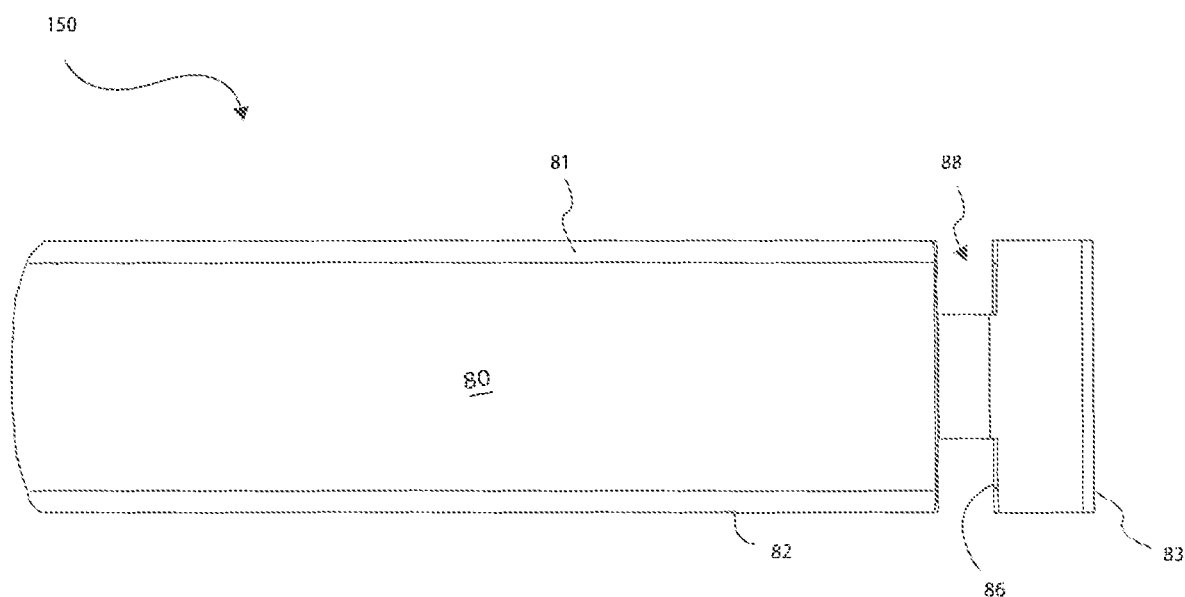
FIG. 8 depicts a side view of an alternate embodiment of a storage clasp apparatus of the present invention.
Figure 9:
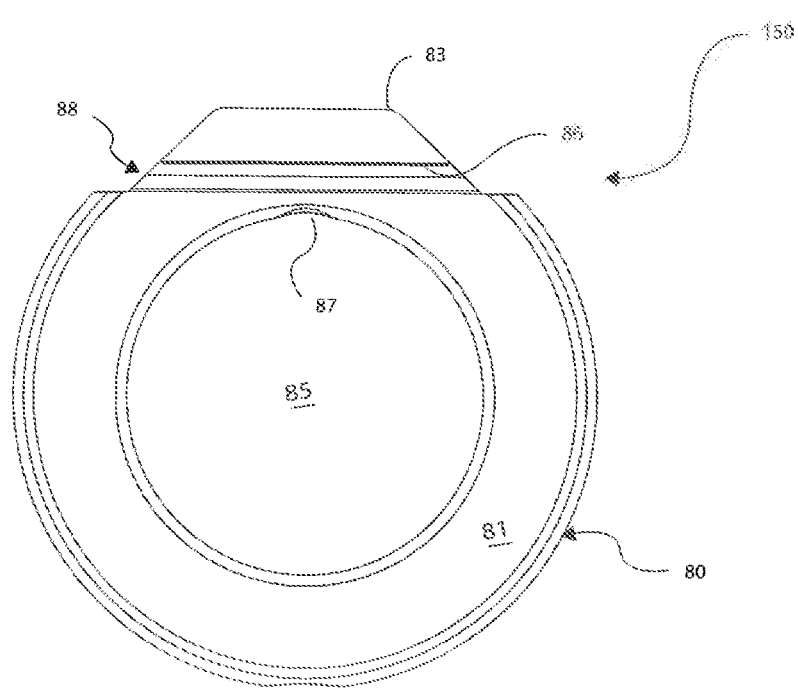
FIG. 9 depicts an aerial view of an alternate embodiment of a storage clasp apparatus of the present invention.

FIGS. 6-9 depict multiple views of an alternate embodiment of a storage clasp apparatus 150 of the present invention. FIG. 6 depicts a perspective view of an alternate embodiment of a storage clasp apparatus 150 of the present invention. FIG. 7 depicts a perspective view of an alternate embodiment of a storage clasp apparatus 150 of the present invention. FIG. 8 depicts a side view of an alternate embodiment of a storage clasp apparatus 150 of the present invention. FIG. 9 depicts an aerial view of an alternate embodiment of a storage clasp apparatus 150 of the present invention. Said alternate embodiment of storage clasp apparatus 150 comprises a substantially circular body member 80, or a loop member, wherein said body member 80 further comprises a top surface 81, a bottom surface 82, a substantially planar end 83, and an internal void 85.

Said loop member 80 comprises a mounting track 86 and a mounting hole 87, wherein said mounting track 86 comprises a channel 88, or a track groove, located within both top surface 81 and bottom surface 82 of loop member 80. Additionally, mounting hole 87 is located on said planar end 83 in a substantially central mid-point. Mounting hole 87 can be used in order to provide an additional means of securing storage clasp apparatus and modular track assembly 200 to a planar surface, such as, for example, a wall or a door.

Still referring to FIGS. 6-9, internal void of substantially circular loop member 80 allows for an alternate end of a fishing rod to be received within, thereby providing an additional means of securely holding and storing said fishing rod, or other similar device that is to be mounted and secured.

FIG. 10A depicts a perspective view of a preferred embodiment of a modular track assembly 100 of the present invention comprising a plurality of storage clasps 50 secured to a slide track assembly 60. FIG. 10B depicts a perspective view of an alternate embodiment of a modular track assembly 200 of the present invention comprising a plurality of loop members 80 secured to a slide track assembly 60.

Storage clasp and modular track assembly 100 of the present invention comprises at least one slide track member 60 that can be mounted to a planar surface, such as, for example, a wall, a ceiling, a door, or any other substantially planar, flat surface, in either a vertical or a horizontal manner. Said slide track member 60 can be manufactured from a substantially rigid and versatile material, such as, for example, an aluminum material, or any other similar material exhibiting like characteristics.

In a preferred embodiment, storage clasp and modular track assembly 100 of the present invention comprises a plurality of storage clasps 50 that are slidably secured within slide track member 60. Slide track member 60 comprises a substantially elongate device having a first end 61, a second end 62, and an internal channel or indentation 65, thereby allowing said mounting track 31 of body member 10 of storage clasp apparatus 50 or said mounting track 86 of loop member 80 of alternate storage clasp 150 to slidably connect to said slide track member 60. Slide track member 60 further comprises a plurality of mounting holes 63, wherein slide track member 60 can be attachably connected to a planar surface via a plurality of screws and wall anchors, nuts and bolts, or any other similar means of attachment. Moreover, slide track member 60 further comprises a plurality of end cap members 40—typically two (2)—wherein said end caps 40 are generally placed on both said first end 61 and said second end 62 of said track member 60, thereby closing off said track member 60.

Referring to FIG. 10A, in a preferred embodiment, a method of using said storage clasp apparatus and modular track assembly 100 comprises a user securely mounting said body member 10 of storage clasp apparatus 50 into either a slide track 60 or directly onto a substantially planar and flat surface. Then, referring to FIG. 10B, said user can then securely mount a plurality of loop members 80 of an alternate storage clasp 150 into either an alternate or additional slide track member 60 or directly onto a substantially planar surface to create a second modular track system 200.

Once slide track members 60 are mounted, a fishing rod can be received within said U-shaped opening 15 of said body member 10 of said storage clasp 50, wherein said arm 21 of said hinge member 20 is then able to close and securely lock said fishing rods in place. When said latch 24 is securely attached to first side 11 of said body member 10, said fishing rods are thereby firmly and securely placed within said storage clasp apparatus 50 for storage. Additionally, said user can then place an alternate end of said fishing rod through said loop 80 on said second modular slide track system 60. When it is time to remove said rod from said storage clasp and modular track assembly 100, said user can then release said latch 24 on storage clasp apparatus 50 by way of said easy release mechanism that allows a user to pull said latch 24 in a direction away from said body member 10 of said storage clasp 50, and thus, remove said fishing rod from said storage clasp apparatus 50, as necessary.

Figure 11A:
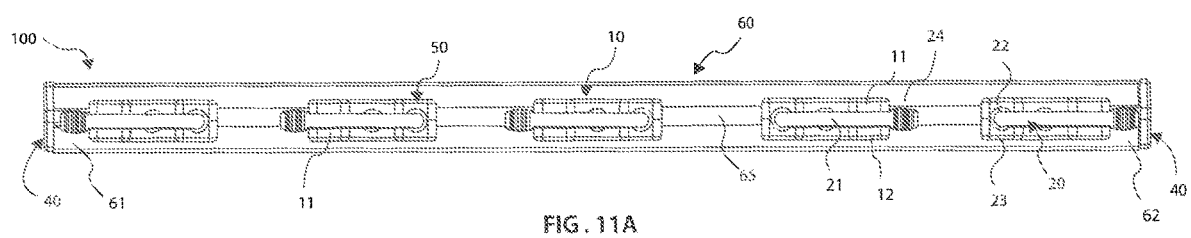
FIG. 11A depicts a front view of a preferred embodiment of a modular track assembly of the present invention comprising a plurality of storage clasps secured to a slide track assembly.
Figure 11B:
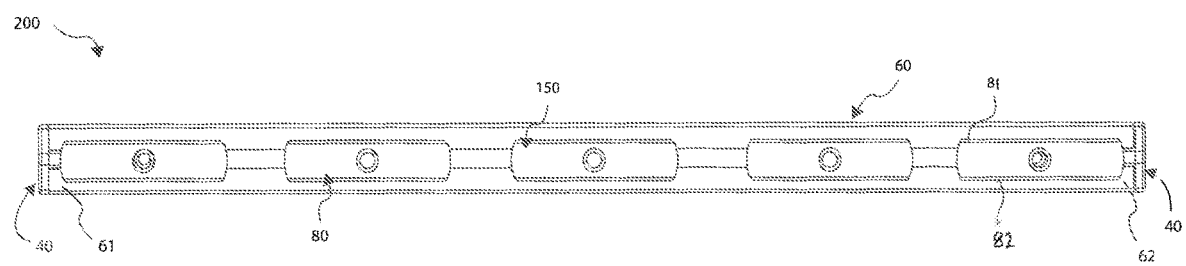
FIG. 11B depicts a front view of an alternate embodiment of a modular track assembly of the present invention comprising a plurality of storage clasps secured to a slide track assembly.

FIG. 11A depicts a front view of a preferred embodiment of a modular track assembly 100 of the present invention comprising a plurality of storage clasps 50 secured to a slide track assembly 60. FIG. 11B depicts a front view of an alternate embodiment of a modular track assembly 200 of the present invention comprising a plurality of loop members 80 secured to a slide track assembly 60.

Figure 12A:
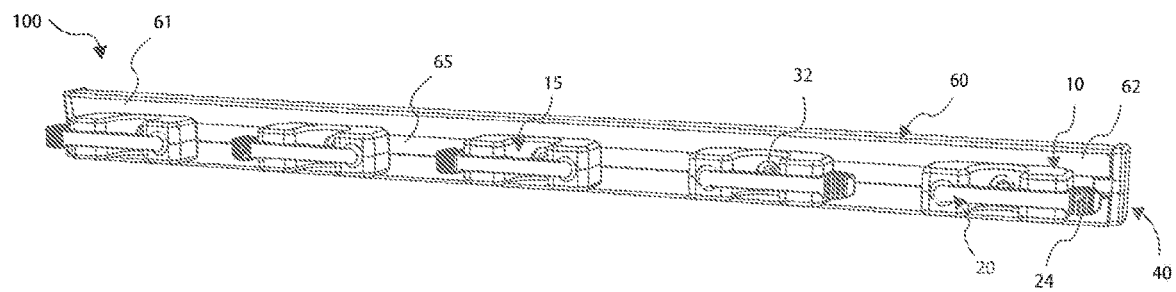
FIG. 12A depicts a perspective view of a preferred embodiment of a modular track assembly of the present invention comprising a plurality of storage clasps secured to a slide track assembly.
Figure 12B:
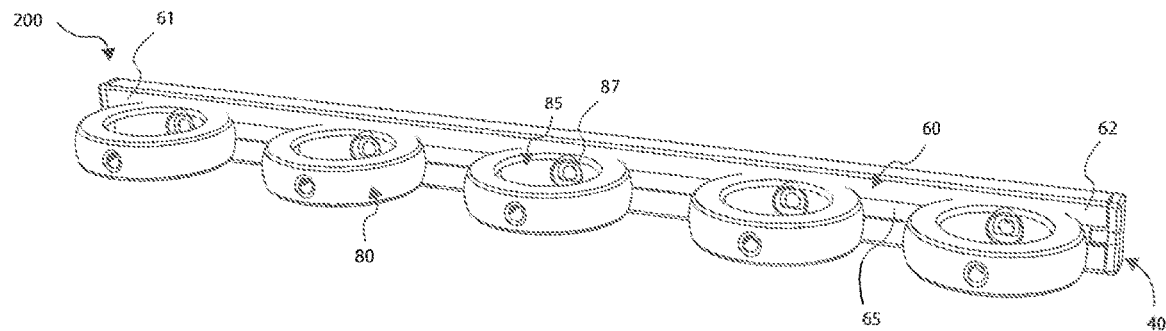
FIG. 12B depicts a perspective view of an alternate embodiment of a modular track assembly of the present invention comprising a plurality of storage clasps secured to a slide track assembly.

FIG. 12A depicts a perspective view of a preferred embodiment of a modular track assembly 100 of the present invention comprising a plurality of storage clasps 50 secured to a slide track assembly 60. FIG. 12B depicts a perspective view of an alternate embodiment of a modular track assembly 200 of the present invention comprising a plurality of loop members 80 secured to a slide track assembly 60.

Figure 13:
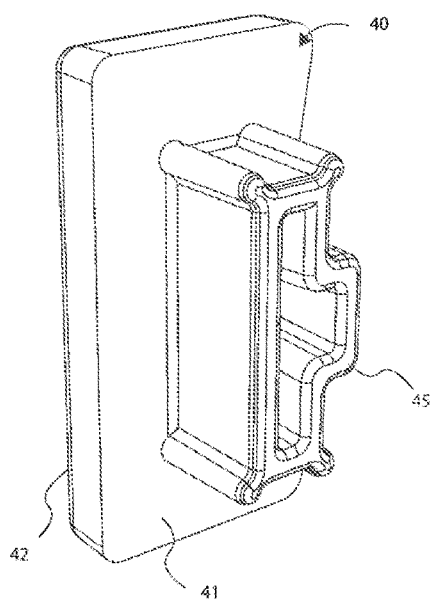
FIG. 13 depicts a perspective view of a preferred embodiment of an end cap member of a modular track assembly of the present invention.

FIG. 13 depicts a perspective view of a preferred embodiment of an end cap member 40 of a modular track assembly 100 of the present invention. End cap member 40 comprises a first end 41 and a second end 42, wherein said first end 41 comprises a substantially outward extending plug member 45 and said second end 42 comprises a substantially planar surface. Said plug 45 comprises a configuration that is intended to align and fit directly with a voided shape of slide track member 60, thereby allowing plug member 45 to be received within both a first end 61 and a second end 62 of slide track member 60, and thus, fully enclose slide track member 60.

Figure 14:
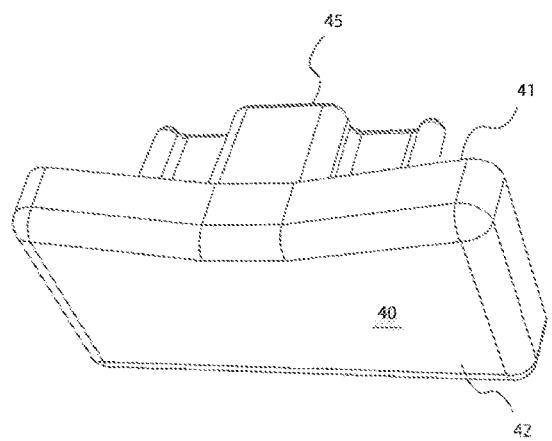
FIG. 14 depicts an alternate perspective view of a preferred embodiment of an end cap member of a modular track assembly of the present invention.

FIG. 14 depicts an alternate perspective view of a preferred embodiment of an end cap member 40 of a modular track assembly 100 of the present invention. End cap member 40 comprises a first end 41 and a second end 42, wherein first end 41 comprises plug member 45 and second end 42 comprises substantially planar surface. Substantially planar surface of end cap 40 allows for both first end 61 and second end 62 of slide track member 60 to have a substantially smooth surface.

Figure 15:
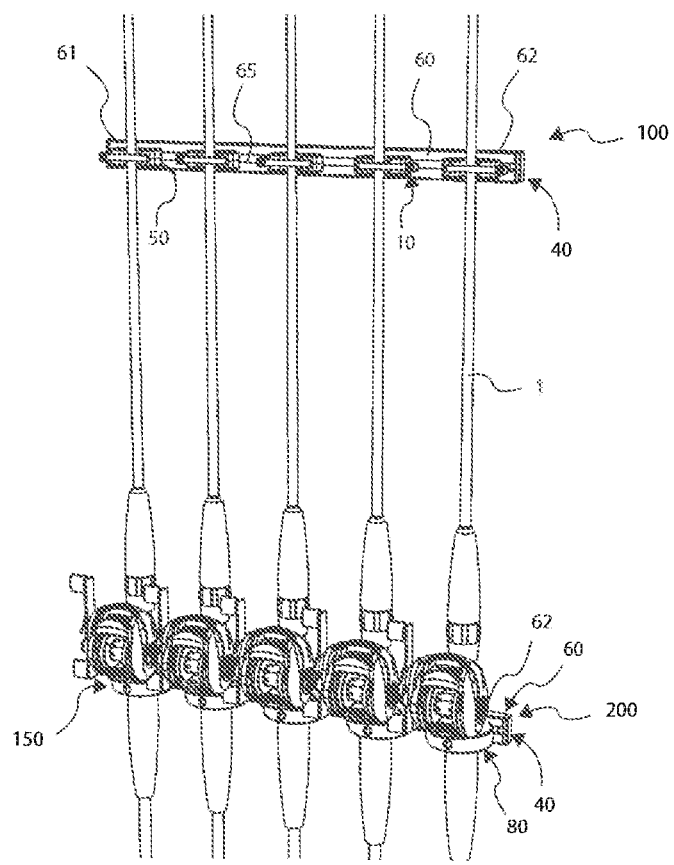
FIG. 15 depicts a front end view of a preferred embodiment of a storage clasp and modular track assembly with a plurality of fishing rods stored within said storage clasp and modular track assembly.
Figure 16:
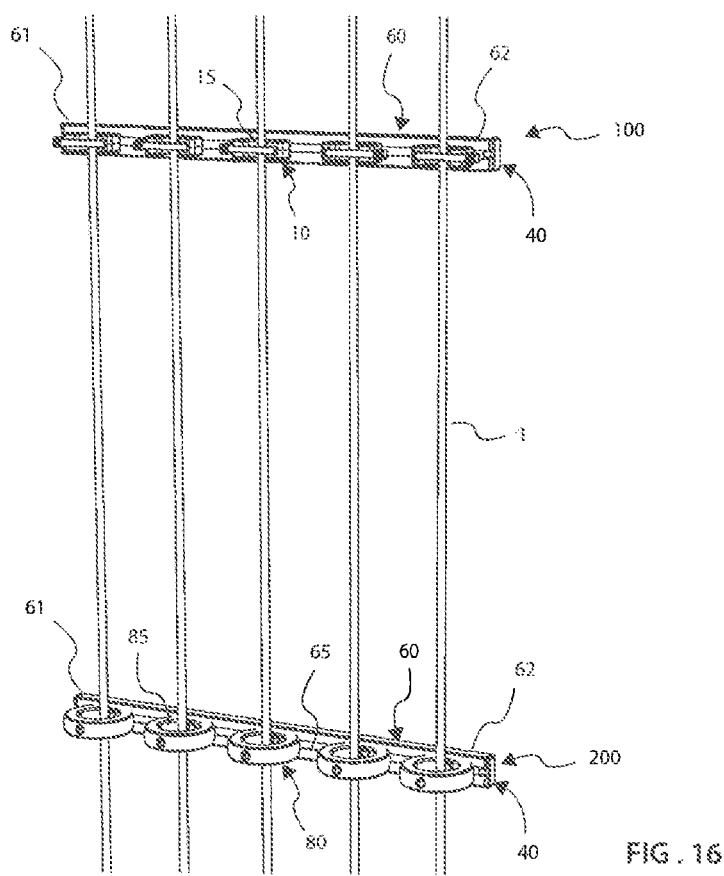
FIG. 16 depicts a front end view of a preferred embodiment of a storage clasp and modular track assembly with a plurality of fishing rods stored within said storage clasp and modular track assembly, and having an additional slide track member comprising a plurality of loops.

FIGS. 15 and 16 both depict a front end view of a preferred embodiment of a storage clasp and modular track assembly 100 with a plurality of fishing rods 1 stored within said storage clasp and modular track assembly 100, and having an additional clasp and track assembly 200 comprising slide track member 60 and said loops 80. Storage clasp and modular track assembly 100 of the present invention comprises at least one slide track member 60 that can be mounted to a planar surface, such as, for example, a wall, a ceiling, a door, or any other substantially planar, flat surface, in either a vertical or a horizontal manner.

In a preferred embodiment, storage clasp and modular track assembly 100 of the present invention comprises storage clasps 50 that are slidably secured within slide track member 60. Slide track member 60 comprises a substantially elongate device having a first end 61, a second end 62, and an internal channel or indentation 65, thereby allowing said mounting track 31 of body member 10 of storage clasp apparatus 50 or said mounting track 86 of loop member 80 of alternate storage clasp 150 to slidably connect to said slide track member 60. Slide track member 60 further comprises mounting holes 63, wherein slide track member 60 can be attachably connected to a planar surface via a plurality of screws and wall anchors, nuts and bolts, or any other similar means of attachment. Moreover, slide track member 60 further comprises end caps 40, wherein said end caps 40 are generally placed on both said first end 61 and said second end 62 of said track member 60, thereby closing off said track member 60, and thus, creating a substantially smooth surface on each end of said track member 60.

Referring to FIGS. 15 and 16, in a preferred embodiment, a method of using said storage clasp apparatus and modular track assembly 100 comprises a user securely mounting said slide track 60 onto a substantially flat and planar surface by way of bolting said slide track member 60 to said surface using a plurality of screws and wall anchors, nuts and bolts, or any other similar attachment means, through mounting holes 63. Said user can then securely mount said body member 10 of storage clasp apparatus 50 into either a slide track 60 by way of slidably moving said mounting track 31 of said storage clasp apparatus 50 into and within indentation 65 of said slide track assembly 60 or by way of directly mounting said storage clasp apparatus 50 onto a substantially planar and flat surface. Then, said user can perform similar steps with an alternate modular track assembly 200 comprising additional slide track member 60 and loop members 80. As such, said user can then securely slide and mount loop members 80 into either an alternate slide track member 60, or said user can directly mount said loop members 80 onto a substantially planar surface to create a second modular track system 200. Then, said user can then secure said end caps 40 to both first end 61 and second end 62 of slide track members 60 by firmly pressing said end caps 40 onto said track ends 61, 62.

Once slide track members 60 are mounted, a fishing rod 1 can be received within said U-shaped opening 15 of said body member 10 of said storage clasp 50, wherein said arm 21 of said hinge member 20 is then able to close and securely lock said fishing rods 1 in place. When said latch 24 is securely attached to said first side 11 of said body member 10, said fishing rods 1 are thereby firmly and securely placed within said storage clasp apparatus 50 for storage. Additionally, said user can then place an alternate end of said fishing rod through said void 85 of loop 80 on said second modular slide track system 200. When it is time to remove said rod 1 from said storage clasp and modular track assembly 100, said user can then release said latch 24 on storage clasp apparatus 50 by way of said easy release mechanism that allows a user to pull said latch 24 in a direction away from said body member 10 of said storage clasp 50, and thus, remove said fishing rod 1 from said storage clasp apparatus 50, as necessary.

Referring to FIGS. 17-24, in an alternate embodiment, the present invention comprises said storage clasp and modular track assembly 100 and alternate storage clasp and modular track assembly 200 being mounted onto a rack member 90. Rack member 90 comprises substantially planar surface, wherein slide track members 60 can be mounted to rack member 90 via any attachment means, thereby allowing storage clasp and modular track assembly 100 of the present invention to be able to store and/or transport up to approximately five (5) fishing rods 1, or other similar devices, in a relatively easy and safe manner, while being able to stay organized. As such, said storage clasp and modular track assembly 100 can be integrated into an additional planar storage device in a relatively seamless manner in order to accommodate a growing fishing rod inventory.

Figure 17:
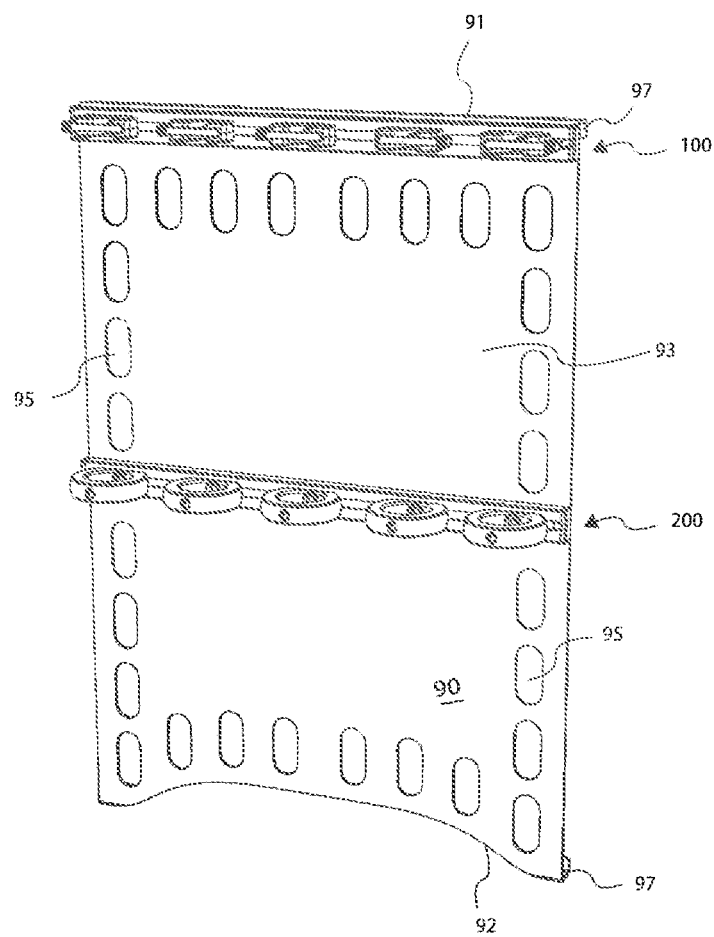
FIG. 17 depicts a perspective view of an alternate embodiment of a storage clasp and modular track assembly mounted to a rack member.
Figure 18:
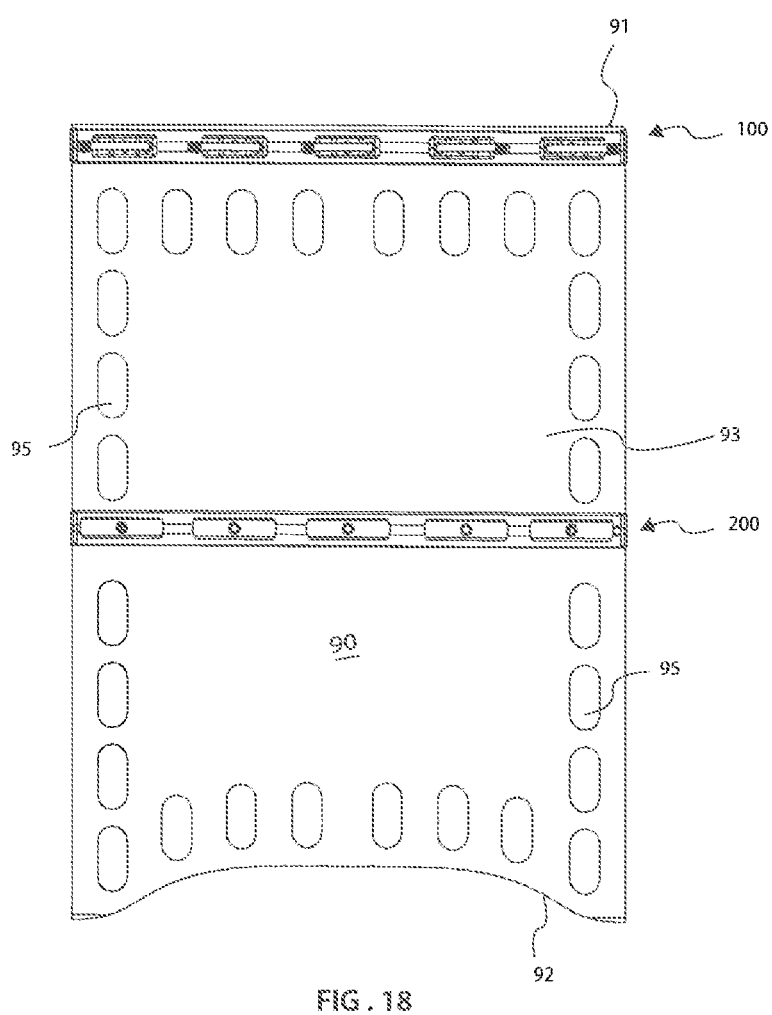
FIG. 18 depicts a front end view of an alternate embodiment of a storage clasp and modular track assembly mounted to a rack member.

FIG. 17 depicts a perspective view of an alternate embodiment of storage clasp and modular track assembly 100, 200 mounted to rack member 90. FIG. 18 depicts a front end view of an alternate embodiment of storage clasp and modular track assembly 100, 200 mounted to rack member 90. In an alternate embodiment, rack member 90 comprises a substantially rectangular shaped planar surface, having a top end 91, a bottom end 92, a front surface 93, and a back surface 94, wherein said planar surface further comprises a plurality of bores 95 along an outer edge of said rack member 90. Said bores 95 can be utilized as hand grips for a user to be able to pick up and transport said rack member 90.

Storage clasp and modular track assembly 100 and alternate storage clasp and modular track assembly 200 can be attachably connected to rack member 90, as opposed to a wall surface, door, or any other similar type of planar surface, by way of said mounting holes 63 of slide track members 60 and a plurality of screws and wall anchors, nuts and bolts, or any other similar type of attachment means.

Figure 19:
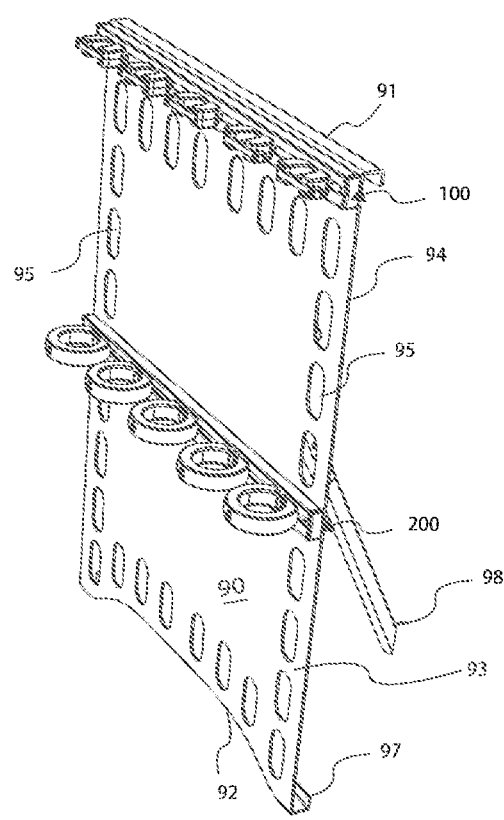
FIG. 19 depicts a perspective view of an alternate embodiment of a storage clasp and modular track assembly mounted to a rack member.

FIG. 19 depicts a side perspective view of an alternate embodiment of storage clasp and modular track assembly 100, 200 mounted to rack member 90. Rack member 90 comprises top end 91, bottom end 92, front surface 93, and back surface 94. Top end 91 and back end 92 each further comprise a ledge member 97 that extends in a substantially outward and perpendicular direction from said rack member 90. Ledge member 97 is utilized as an additional shelf for assisting rack member 90 in staying upright when rack member 90 is placed on a ground surface in an upright position. Additionally, rack member 90 comprises stand member 98, wherein stand member 98 holds rack member 98 in an upright position when rack member 90 is placed on a ground surface.

Figure 20:
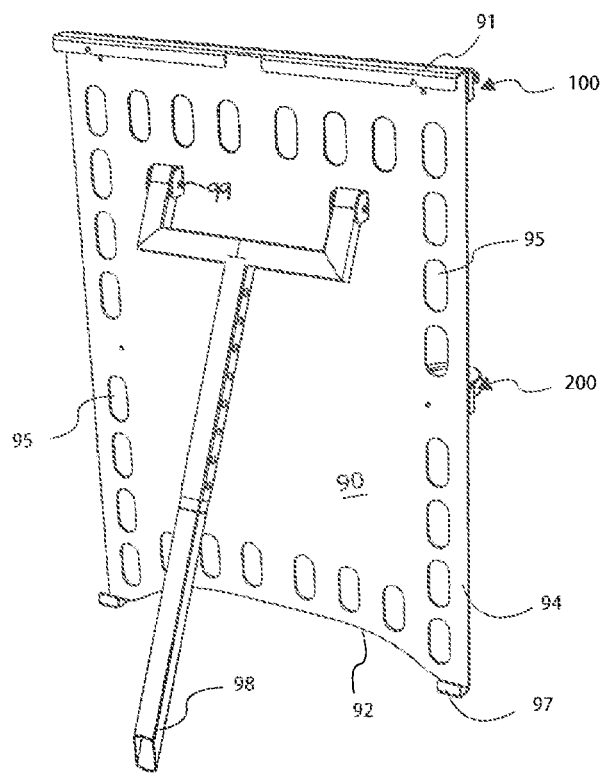
FIG. 20 depicts a rear end view of an alternate embodiment of a storage clasp and modular track assembly mounted to a rack member.
Figure 21:
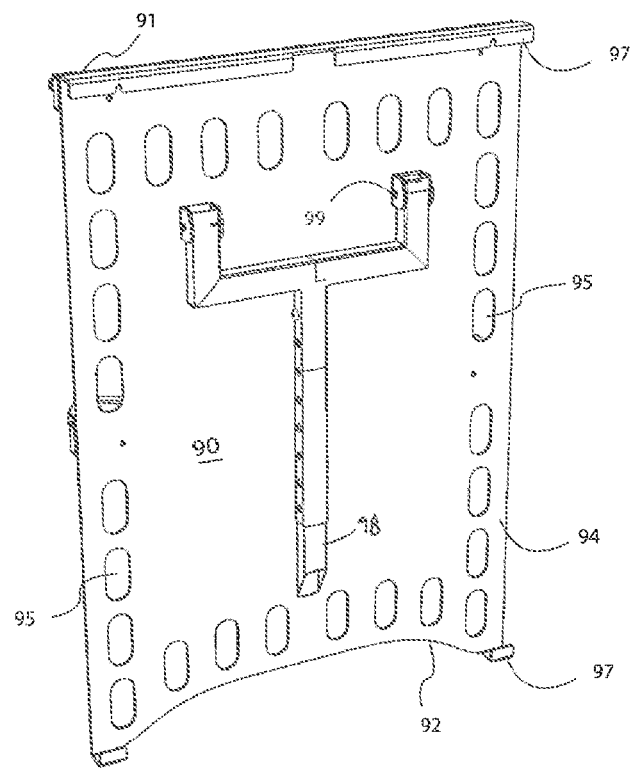
FIG. 21 depicts an alternate rear end view of an alternate embodiment of a storage clasp and modular track assembly mounted to a rack member.

FIG. 20 depicts a rear perspective view of an alternate embodiment of storage clasp and modular track assembly 100, 200 mounted to rack member 90, wherein stand member 98 is in an open configuration. FIG. 21 depicts a rear view of an alternate embodiment of storage clasp and modular track assembly 100, 200 mounted to rack member 90, wherein stand member 98 is in a closed configuration. Rack member 90 comprises stand member 98, wherein stand member is attachably connected to back surface 94 of rack member 90. Stand member is hingedly attached to back surface 94 by way of a hinge connection 99. Hinge connection 99 allows stand member to hingedly open and close in relation to rack member, as necessary.

As such, when stand member 98 is in a substantially open position, stand member 98 assists rack member 90 in being placed in an upright position without any other assistance. When stand member 98 is in a substantially closed position, stand member is adjacently placed along back surface 94 of rack member 90, thereby allowing a user to pick up rack member 90 and transport rack member 90, and thus, a plurality of fishing rods 1, to a different location.

Figure 22:
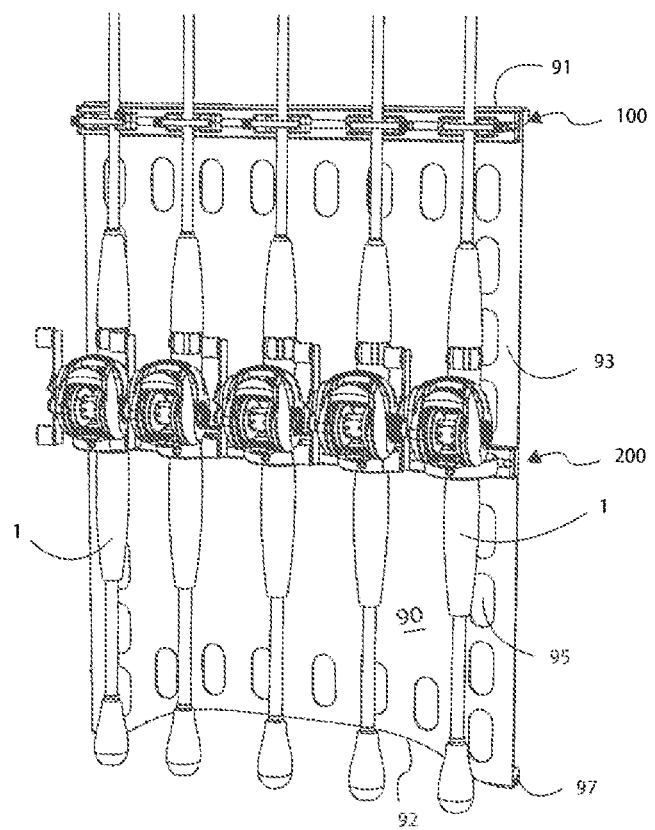
FIG. 22 depicts a front end view of an alternate embodiment of a storage clasp and modular track assembly mounted to a rack member comprising a plurality of fishing rods.
Figure 23:
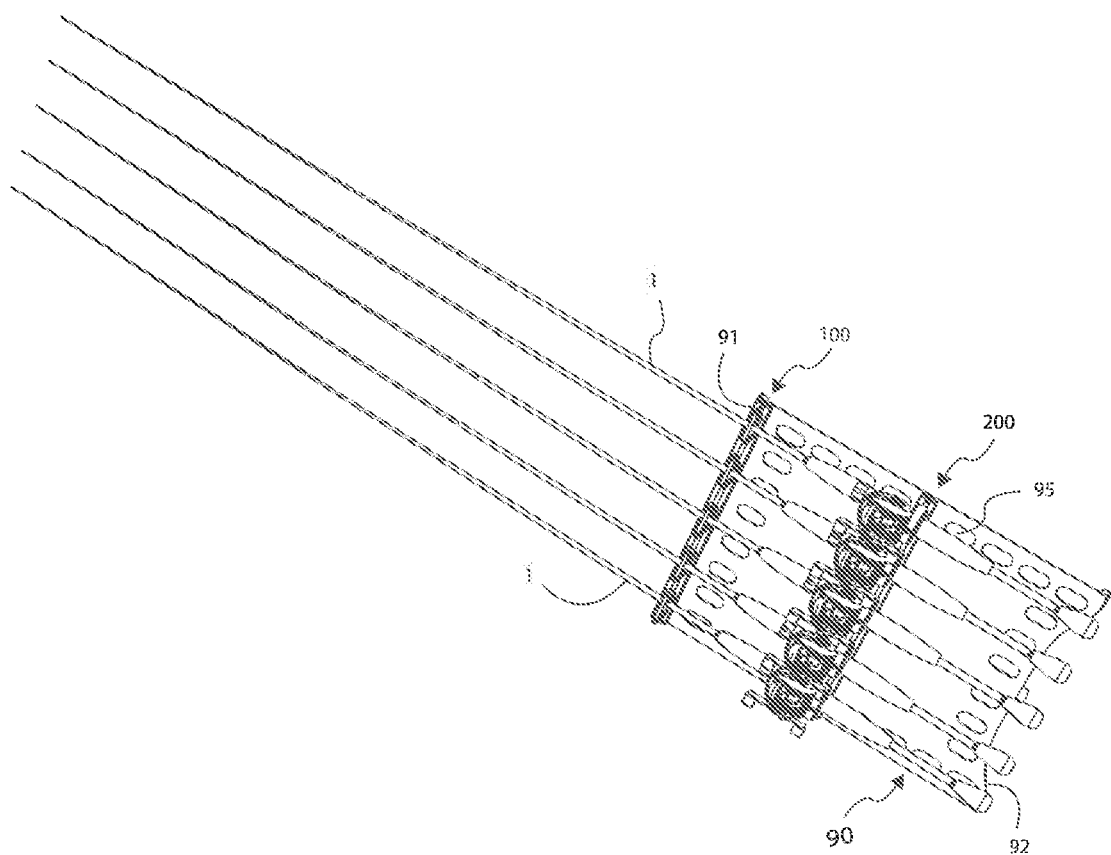
FIG. 23 depicts a perspective view of an alternate embodiment of a storage clasp and modular track assembly mounted to a rack member comprising a plurality of fishing rods.
Figure 24:
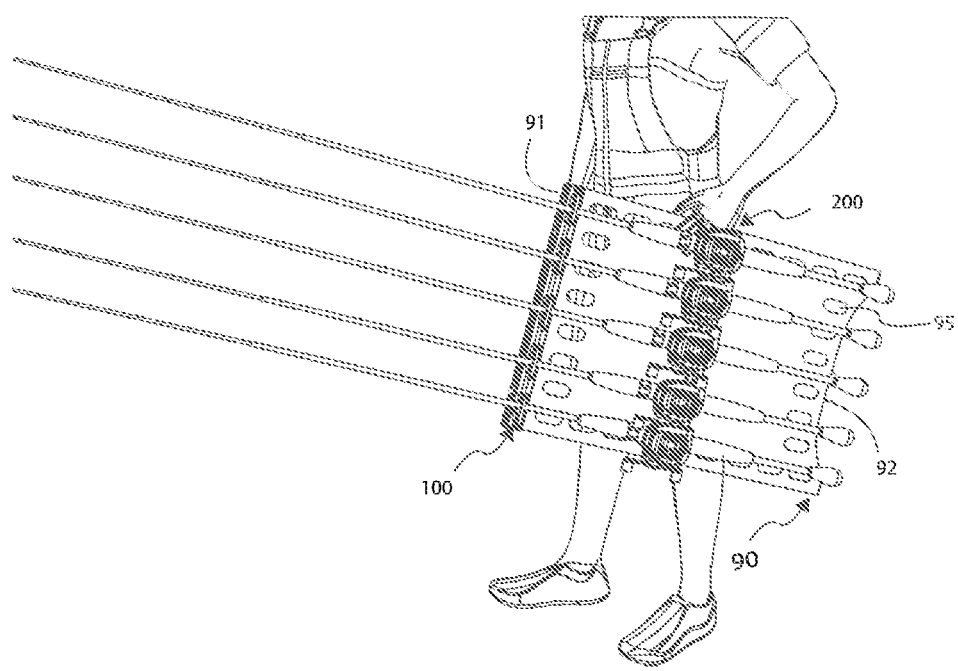
FIG. 24 depicts a perspective view of an alternate embodiment of a storage clasp and modular track assembly mounted to a rack member comprising a plurality of fishing rods and being transported by a user.

FIG. 22 depicts a front end view of an alternate embodiment of a storage clasp and modular track assembly 100, 200 mounted to rack member 90 comprising a plurality of fishing rods 1, while FIG. 23 depicts a perspective view of an alternate embodiment of a storage clasp and modular track assembly 100, 200 mounted to rack member 90 comprising a plurality of fishing rods 1. Additionally, FIG. 24 depicts a perspective view of an alternate embodiment of a storage clasp and modular track assembly 100, 200 mounted to rack member 90 comprising a plurality of fishing rods 1 and being transported by a user. Referring to FIG. 24, a user is able to manually pick up and transport rack member 90 by way of placing his or her hands within bores 95, or hand grips, of rack member, and thus carry rack member 90 and said fishing rods 1 to an alternate location, as desired.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for storing, transporting, or organizing a fishing rod, comprising a clasp member having a first end, a second end, a top surface, and a bottom surface, wherein:
    a) said first end, said second end, said top surface, and said bottom surface of said clasp member are oriented in a configuration that defines an inner void, and said first end of said clasp member and said second end of said clasp member are oriented on opposite sides from one another;
    b) said first end of said clasp member comprises a locking mechanism, and said second end of said clasp member comprises a mounting track;
    c) said locking mechanism comprises an arm member, having a latch and a hinge member;
    d) said hinge member further comprises a ball hinge located within a ball cavity;
    e) said ball hinge rotates within said ball cavity to allow said hinge member to open and close; and
    f) said latch fastens to a notch located on said clasp member.

2. The apparatus of claim 1, wherein said mounting track on said second end of said clasp member comprises a track groove and a mounting hole.

3. The apparatus of claim 2, further comprising a slide track having a first end, a second end, an internal channel, and a plurality of mounting holes.

4. The apparatus of claim 3, wherein said mounting track on said second end of said clasp member slidably extends and is received within said internal channel of said slide track, thereby attachably connecting said clasp member to said slide track.

5. A method of storing, transporting, and organizing a fishing rod, comprising:

a) mounting a storage clasp and modular track apparatus to a planar surface, wherein said apparatus comprises:
  i. a clasp member having a first end, a second end, a top surface, and a bottom surface, wherein said first end, said second end, said top surface, and said bottom surface of said clasp member are oriented in a configuration that defines an inner void, and said first end of said clasp member and said second end of said clasp member are oriented on opposite sides from one another;
  ii. said first end of said clasp member comprises a locking mechanism, and said second end of said clasp member comprises a mounting track;
  iii. said locking mechanism comprises an arm member, having a latch and a hinge member;
  iv. said hinge member further comprises a ball hinge located within a ball cavity;
  v. said ball hinge rotates within said ball cavity to allow said hinge member to open and close;
  vi. said latch fastens to a notch located on said clasp member;
b) opening said locking mechanism of said clasp member and inserting a fishing rod within said inner void of said clasp member; and
c) closing and locking said locking mechanism of said clasp member, thereby securing said fishing rods within said clasp member.

6. The method of claim 5, wherein said mounting track on said second end of said clasp member comprises a track groove and a mounting hole.

7. The method of claim 6, further comprising a slide track having a first end, a second end, an internal channel, and a plurality of mounting holes.

8. The method of claim 7, wherein said mounting track of said clasp member slidably extends and is received within said internal channel of said slide track, thereby attachably connecting said clasp member to said slide track.

* * * * *